US008992200B2

(12) United States Patent
Van Nieuwenhove et al.

(10) Patent No.: US 8,992,200 B2
(45) Date of Patent: Mar. 31, 2015

(54) RESIN INFUSION APPARATUS AND SYSTEM, LAYUP SYSTEM, AND METHODS OF USING THESE

(75) Inventors: Stefaan Guido Van Nieuwenhove, Hohenkammer (DE); Thomas Koerwien, Hohenkirchen (DE); Shu Ching Quek, Clifton Park, NY (US); Thomas Miebach, Ballston Spa, NY (US)

(73) Assignee: General Electric Company, Niskayuna, NY (US)

(*) Notice: Subject to any disclaimer, the term of this patent is extended or adjusted under 35 U.S.C. 154(b) by 725 days.

(21) Appl. No.: 12/648,404

(22) Filed: Dec. 29, 2009

(65) Prior Publication Data

US 2011/0155849 A1 Jun. 30, 2011

(51) Int. Cl.
    *B29C 70/00* (2006.01)
    *B29C 70/54* (2006.01)
    *B29C 70/44* (2006.01)

(52) U.S. Cl.
    CPC ............. *B29C 70/546* (2013.01); *B29C 70/443* (2013.01); *Y02T 50/433* (2013.01); *Y02T 50/43* (2013.01)
    USPC .................................................... 425/129.1

(58) Field of Classification Search
    CPC .. B29C 70/443; B29C 70/547; B29C 70/548; B19C 70/546
    USPC ................. 425/129.1, 543, 389; 264/571, 510
    See application file for complete search history.

(56) References Cited

U.S. PATENT DOCUMENTS

| | | | | |
|---|---|---|---|---|
| 4,008,545 A * | 2/1977 | Koide et al. | ..................... | 451/70 |
| 4,132,755 A * | 1/1979 | Johnson | ........................ | 264/553 |
| 4,468,363 A * | 8/1984 | Miessler | ....................... | 264/128 |
| 4,942,013 A * | 7/1990 | Palmer et al. | ................. | 264/511 |
| 4,943,472 A | 7/1990 | Dyksterhouse et al. | | |
| 5,576,030 A * | 11/1996 | Hooper | ......................... | 425/112 |
| 5,620,420 A * | 4/1997 | Kriesel | ......................... | 604/133 |
| 5,866,053 A * | 2/1999 | Park et al. | ........................ | 264/50 |
| 6,257,858 B1 * | 7/2001 | Pabsch et al. | ............... | 425/129.1 |
| 6,422,528 B1 * | 7/2002 | Domeier et al. | ................ | 249/60 |
| 6,508,974 B1 | 1/2003 | Loving | | |
| 6,679,471 B2 | 1/2004 | Domeier et al. | | |
| 6,926,856 B2 * | 8/2005 | Hus et al. | ...................... | 264/257 |
| 7,297,740 B2 | 11/2007 | Dyksterhouse | | |
| 2006/0035548 A1 | 2/2006 | Goto et al. | | |

(Continued)

FOREIGN PATENT DOCUMENTS

DE      10105973      9/2002

OTHER PUBLICATIONS

EP 10194646 Search Report, Apr. 24, 2011.

(Continued)

*Primary Examiner* — Yogendra Gupta
*Assistant Examiner* — Ninh Le
(74) *Attorney, Agent, or Firm* — Ann M. Agosti

(57) ABSTRACT

A resin infusion apparatus and system, layup system comprising the same, and methods of using these are provided. The resin infusion apparatus comprises a hollow cylinder having a plurality of pores perforating an arcuate surface thereof. The interior of the cylinder is provided with one or more flow restrictors that assist in controlling the flow out of the pores of the cylinder. Laminates made of prepregs prepared using the apparatus and/or system may thus be essentially free of voids.

13 Claims, 3 Drawing Sheets

(56) References Cited

U.S. PATENT DOCUMENTS

2007/0178311 A1    8/2007  Akagi
2008/0047640 A1*   2/2008  Rumbaugh .................. 152/157
2008/0079193 A1*   4/2008  Hanks et al. .................. 264/257

OTHER PUBLICATIONS

DE10105973 Abstract, Aug. 22, 2002.

* cited by examiner

RESIN INFUSION APPARATUS AND SYSTEM, LAYUP SYSTEM, AND METHODS OF USING THESE

BACKGROUND

Fiber composite materials have wide application in the automotive and aerospace industries. These materials are lightweight, while offering good strength and rigidity.

Fiber composite laminates or parts may typically be manufactured by first impregnating the fiber reinforcement with resin to form a prepreg, and then consolidating two or more layers of prepreg into a laminate. Although also useful for bonding the individual layers of prepreg together, the consolidation step may also be necessary to reduce or eliminate voids in the resulting laminate. These voids in turn, may result from the inefficient penetration of the resin in to the fiber bundle, tow, or roving.

Consolidation can be an undesirable method for forming the individual layers of prepreg into a laminate as well as removing the voids that may be present therein. This is because consolidation can require the application of heat and pressure, and thus, the use of the expensive equipment capable of applying such conditions, e.g., autoclaves, for extended periods of time. For some applications, the size of the part, and the corresponding cost of the specialized equipment required, may render consolidation cost prohibitive. Further, outgasing that may occur during consolidation may actually produce voids in the laminate and/or prepregs, In recent years, low cost methods for removing voids from prepregs and/or preparing laminates from the same have been developed that do not require application of pressure. However, generally speaking, these methods may leave undesirable residual voids in the prepregs and/or laminates processed via such methods. As a result, parts prepared from such laminates can exhibit compromised strength.

Other methods utilized for reducing voids in laminates prepared from prepregs include reducing the viscosity of the resin prior to impregnation so that it will more readily and uniformly flow onto and into the reinforcing material. For example, such methods have provided for heating the resin or diluting the same with solvents. However, although generally useful, these methods may not completely eliminate the problem of voids in laminates prepared from prepregs.

It is desirable to provide improved apparatus and methods for uniformly infusing resin into reinforcing materials, such as fibers, fiber bundles, tows, roving or plies. Desirably, the apparatus/method provided would be capable of ready incorporation into existing methods, or combination with existing apparatus, for providing layups of prepregs

BRIEF DESCRIPTION

There is provided a resin infusion apparatus for forming a prepreg from a resin and a reinforcing material. The apparatus comprises at least one hollow cylinder having a plurality of pores perforating an arcuate surface thereof, and an orifice for the admission of a fluid to the interior of the cylinder on at least one flat surface thereof, wherein at least a portion of the interior of the cylinder is provided with one or more flow restrictors.

In another aspect, there is provided a resin infusion system for forming a prepreg from a resin and a reinforcing material. The system comprises the resin infusion apparatus and a pump for supplying a fluid to the interior of the cylinder.

Methods for infusing a resin into a reinforcing material to form a prepreg are also provided and comprising using the apparatus or system described herein to form the prepreg.

In another aspect, there is provided a system for providing a laminate of a plurality of prepregs. The system comprises the resin infusion system and a layup apparatus. A method for providing a laminate of a plurality of prepregs, using the system, is also provided.

DRAWINGS

These and other features, aspects, and advantages of the invention will become better understood when the following detailed description is read with reference to the accompanying drawings in which like characters represent like parts throughout the drawings, wherein.

DETAILED DESCRIPTION

Figure 1:
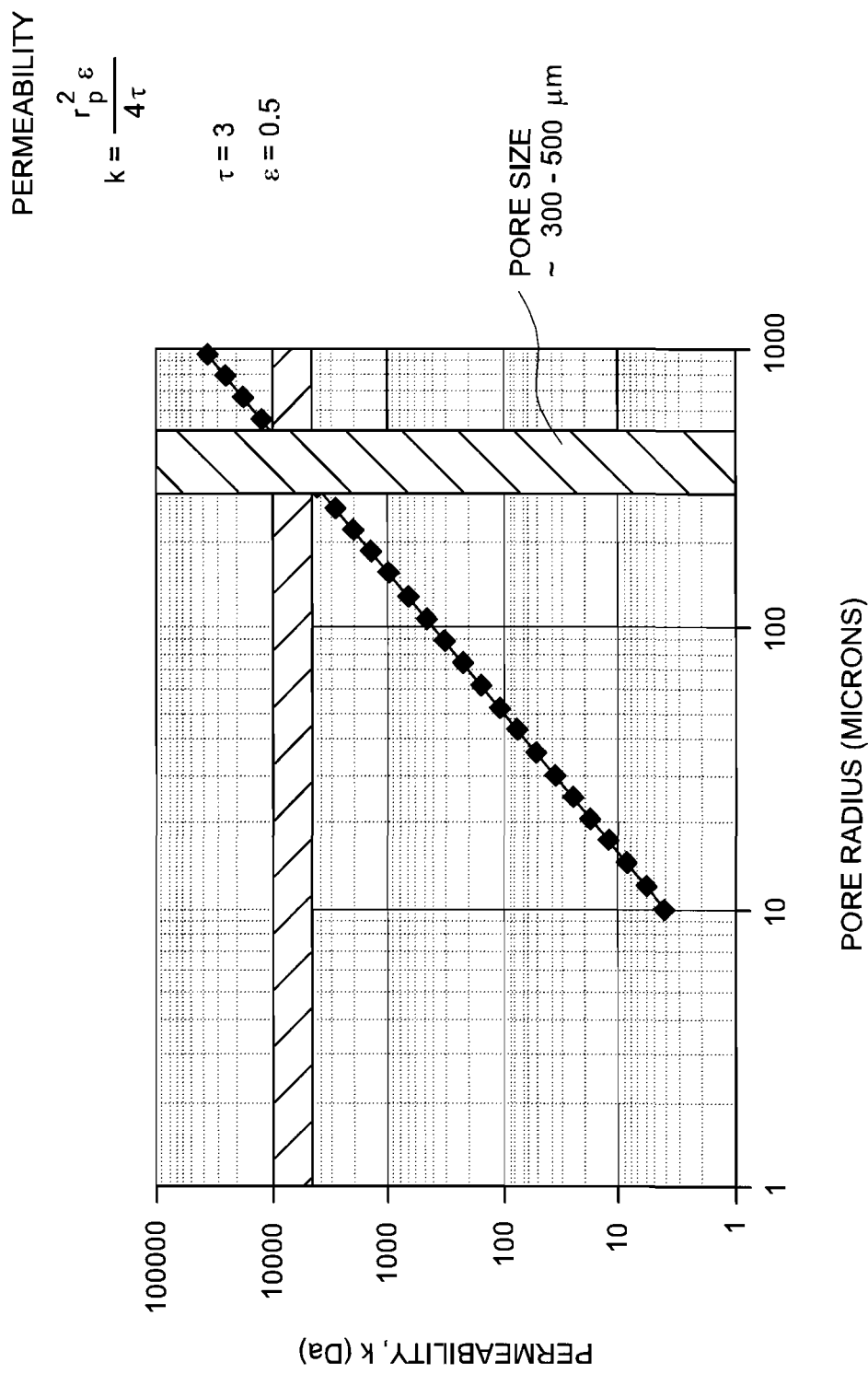
FIG. 1 is a graphical depiction of the pore radius of the flow restrictors used in some embodiments versus the permeability thereof.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

There are provided herein apparatus and systems for infusing a reinforcing material with a resin to form prepregs as well as such systems in combination with layup apparatus to provide laminates of prepregs. Advantageously, the apparatus described herein provides substantially uniform flow of resin onto the reinforcing material, so that a cured laminate prepared from the resulting prepreg is substantially free of voids. And, the apparatus is desirably of a size and design so that it may readily be added to, or otherwise incorporated into, a lay-up apparatus so that the prepreg and lamination process can be carried out substantially continuously.

More particularly, the resin infusion apparatus comprises at least one hollow cylinder having a plurality of pores on an arcuate surface thereof connecting the interior of the cylinder with the exterior of the cylinder, and an orifice for the admission of a fluid to the interior of the cylinder on at least one flat surface thereof, wherein at least a portion of the interior of the cylinder is provided with one or more flow restrictors.

The hollow cylinder may be formed from any suitable material. Desirably, the material will be stable, i.e., will not substantially degrade, corrode, or foul, when exposed to the resin or conditions at which the resin is applied to the reinforcing material. In some embodiments, the cylinder may be formed from stainless steels, titanium, alloys, plastics, etc. In some embodiments, the hollow cylinder comprises an aluminum alloy.

The size of the cylinder is not critical, and may be selected in light of other conditions utilized in the infusion process to assist in providing the desired effect, i.e., uniform flow of resin from the cylinder. For example, the dimensions of the cylinder may be determined in light of the dimensions of the reinforcement material desirably infused with resin, the viscosity of the resin, the pressure desirably applied to the resin, the flow rate of the resin from the pores of the hollow cylinder, etc. In one exemplary embodiment, the cylinder may have a length of from about 50 mm to about 400 mm, an outer diameter of from about 20 mm to about 100 mm, and an inner diameter of from about 17 mm to about 95 mm.

The cylinder is provided with a plurality of pores disposed on, and that perforate, arcuate surfaces of the hollow cylinder, i.e., the pores connect the interior of the cylinder with the exterior of the cylinder. The pores may have any desired diameter, and the pore diameter may be selected based upon the desired flow out of the same, in light of other process parameters that may impact the same, such as the resin being infused and the properties thereof, e.g., resin viscosity. Desirably, the pore diameter will allow, or contribute to, the even flow of the desired resin out of the same. In some embodiments, the pores desirably have a diameter of from about 0.2 mm to about 2 mm.

The pore spacing may desirably be such that the open area of the cylinder, i.e., area not occupied by pores, is at least about 25%, or at least about 30%, or at least about 35%. The distance between the pores may desirably be approximately substantially equivalent to the diameter of the pores, i.e., the distance between the pores may desirably be between about 0.2 mm and about 2 mm.

The pores may be provided across substantially the entirety of the length and/or around substantially the entirety of the circumference of the cylinder, or only portions thereof. In some embodiments, the pores will desirably be provided across a length of the cylinder substantially equal to the width of a reinforcing material desirably infused with resin using the apparatus.

The pores may be provided around substantially the entirety of the circumference of the cylinder, or only a portion thereof. In some embodiments, the pores are advantageously provided around substantially the entirety of the circumference of the cylinder as it is believed that such a configuration will help reduce any voids in resin that may otherwise be formed on or within the reinforcing material.

The pores may be provided in any density along the length, or around the circumference of the cylinder. Desirably, whatever the density of the pores, it will be sufficient to provide a flow of resin out of the pores and onto/into the reinforcing material that at least assists in substantially coating the reinforcing material. Further, the arrangement of the pores may be uniform, i.e., the distance between the individual pores may be substantially equivalent, or may vary, either purposefully, i.e., the pores may be provided in a pattern wherein the pore distance varies, or as a function of manufacturing variances in producing the hollow cylinders.

As with the disposition of pores along the length or around the circumference of, the cylinder, the appropriate density and arrangement can depend on other factors, such as the resin being applied and the properties thereof, as well as the reinforcing material being infused and its properties. Given the above parameters, it is believed that those of ordinary skill in the art will be capable of determining an arrangement or pattern of pores on the hollow cylinder that will substantially achieve at least a portion of the objectives described herein.

The hollow cylinder also desirably comprises at least one resin inlet provided on a flat surface thereof, connecting the exterior of the cylinder with the interior thereof, through which the desired resin may be introduced. The resin inlet can have any geometry or configuration, that is, the resin inlet may actually comprise a plurality of inlets, and may have any shape, that is the resin inlet(s) may be generally circular, square, triangular, rectangular, oval, etc.

In some embodiments, the resin inlet is generally circular. Further, in such embodiments, the resin inlet may have any diameter, and may have a diameter as large as the diameter of the cylinder, i.e., in some embodiments, the cylinder may comprise only one flat surface the other being the resin inlet. In others, the resin inlet will have a diameter less than the diameter of the cylinder. In such embodiments, the resin inlet may have a diameter that is about 90%, or about 80%, or about 70%, or about 60%, or even about 50% or less, of the diameter of the cylinder.

The cylinder may be provided with two resin inlets, in which case, one will desirably be provided on each flat surface of the cylinder. In such embodiments, the orifices may have the same, or a different, diameter. It may be the case that providing the orifices with substantially uniform diameters, may assist in providing for the substantially uniform flow from a majority of the pores of the hollow cylinder, and so this may be the desired configuration in some embodiments.

At least a portion of the interior of the cylinder is provided with one or more flow restrictors. The flow restrictor(s) desirably act(s) to restrict the flow of resin through and out of the cylinder, so that the resin fills substantially the entirety of the interior of the cylinder prior to exiting through the pores. Since substantially the entirety of the interior of the cylinder is filled with resin prior to the exit thereof through the pores, the flow rate of the resin will be substantially equivalent out of at least a majority (i.e., greater than 50%) of the pores, if not about 60%, or 70%, or 80% or 90%, or 95%, or even substantially all of the pores. Also, undesirable leakage of resin out of the pores of the cylinder may be reduced or substantially eliminated.

The flow restrictors may be of any material or configuration capable of controlling the flow or resin within the cylinder so that the interior of the cylinder is substantially filled prior to allowing exit of the resin from the pores. The flow restrictor(s) may be permanently or temporarily attached to the interior of the cylinder, or may be separate and designed to be inserted or removed from the cylinder as desired, to achieve a desired flow of resin through or from the cylinder. In some embodiments, the flow restrictor(s) is/are removable so that the same may be selected and utilized based upon the resin and reinforcing material being infused so that the apparatus and systems are adaptable to a variety of prepreg applications. Removable flow restrictors may also render the hollow cylinders and flow restrictors more easily cleanable than if the flow restrictor(s) is/are permanently attached to the hollow cylinder.

If desirably removable, the flow restrictor(s) may either be free standing within the cylinder, or, may be held in place by a removable means, i.e., such as by a temporary adhesive or a mechanical placeholder, or an integral piece of the hollow cylinder.

Foams are particularly suitable for use as the flow restrictor(s), since, in such embodiments, the pore size of the foam may assist in controlling the flow of the resin therethrough. The foam utilized in such embodiments may be of any material and configuration useful for flow control of the resin, although the foam material will desirably be substantially inert to the conditions employed in the prepreg process. That is, the prepreg temperature, pressure, moisture and particular resin utilized will desirably not result in the substantial degradation of the foam material.

Due to the temperatures and/or pressures utilized in some prepreg processes, in some embodiments, the foam may desirably be a metal. Suitable metals are of sufficient strength so that the integrity thereof is not substantially compromised during the prepreg process, i.e., the cell structure thereof will not substantially degrade during the prepreg process. The metal utilized will also desirably not degrade during the prepreg process, i.e., the metal will desirably not oxidize, foul, or otherwise degrade in a way that will cause the resulting prepreg to become contaminated with oxidation and/or fouling products of the metal or compromise the integrity of the foam.

Plastic foams may be utilized in some embodiments, provided the plastic is substantially inert to the resin, and able to function at the temperatures and pressures utilized in the process. Indeed, in some embodiments, plastic foams may provide the opportunity for one time use, should the cleaning of a metal foam in the particular application be deemed undesirably time-consuming.

Those of ordinary skill in the art, given these parameters and the prepreg process desirably conducted, would be capable of selecting a suitable foam. Generally speaking then, suitable metal foams include, but are not limited to, aluminum alloys, copper alloys and zinc alloys. One non-limiting example of a metal foam suitable for use as the flow restrictor(s) provided includes that commercially available under the tradename Retimet®, from Dunlop Equipment (England).

The flow restrictor(s) may be provided in any configuration suitable to control the flow of the resin out of the pores of the cylinder. In some embodiments, the configuration of the flow restrictor(s) utilized will be such that, when inserted into the cylinder, the flow restrictor abuts the interior of the cylinder so that a substantial amount of resin cannot flow between the interior surface of the cylinder and the outer surface of the flow restrictor(s).

In some embodiments, the flow restrictor(s) desirably comprise(s) one or more foam rings or discs, and/or one or more metal foam rings or discs that abut the interior surface of the cylinder when inserted therein so that a substantial amount of resin will not flow between the metal foam ring/disc and the interior surface of the cylinder. Stated another way, in some embodiments, the outer diameter of the flow restrictors may be approximately the same as the inner diameter of the cylinder, differing only by the amount required so that the flow restrictors fit tightly within the hollow cylinder. Rather, the resin will flow through the center of the metal foam ring/disc until the cylinder is substantially filled with resin, prior to exiting through the pores of the cylinder.

In such embodiments, the foam ring/disc may desirably be temporarily held in place so that the conditions of the prepreg process do not result in substantial displacement of the foam ring(s). Any suitable method of doing so may be utilized, so long as it provides at least some resistance to displacement of the rings/discs during the prepreg process. For example, the ring(s)/disc(s) may be held in place by a temporary adhesive, or any suitable mechanical method. In some embodiments, the rings/discs are desirably held in place by blocking rings.

The flow restrictor(s) are desirably provided in a configuration within the cylinder so that substantially all of the resin encounters at least one flow restrictor prior to a majority, i.e., greater than 50%, of the plurality of pores. In some embodiments, the resin will encounter at least one flow restrictor prior to encountering about 80%, or 90%, or 95% or even up to 100% of the pores within the plurality. Stated another way, the flow restrictors are desirably provided within a portion of the cylinder that substantially corresponds to the portion of the arcuate surface perforated by the plurality of pores. In this fashion, the flow restrictor(s) is/are capable of controlling the flow or resin out of at least a portion of the pores, desirably a majority of the pores, and even more desirably, about 80%, or 90%, or 95% or even up to 100% of the pores.

One or more flow restrictors may be utilized to provide the desired pore coverage. In those embodiments wherein the flow restrictors desirably comprise a foam ring or disc, or metal foam ring or disc, for example, one or more rings/dics may be inserted into the cylinder, in order to control the flow of resin out of at least a portion of the plurality of pores thereof.

When the flow restrictor comprises a foam, or metal foam, the average pore size thereof may be selected to provide the desired permeability through the foam, and thus to and out of, the pores of the cylinder. Although the exact flow rate of the resin through the cylinder may depend upon the prepreg process being conducted, in some embodiments, the average pore size of the foam may desirably be less than about 800 microns, or less than about 600 microns. In some embodiments, the average pore size of the foam will desirably be from about 300 to about 500 microns. At such an average pore size, the permeability of the foam, or metal foam, is expected to be greater than about 5000 Da, or greater than about 6000 Da, or greater than about 7000 Da, or greater than about 8000 Da, or greater than about 9000 Da, or even up to about 10000 Da.

For example, FIG. 1 shows the results of a computer simulation with changing values of permeability and desired mass flow rate of up to 5 g/sec. More particularly, FIG. 1 shows that a permeability of 5000-10000 Da results in a well distributed resin flow over the width of a hollow cylinder according to some embodiments. Additional required inputs for the simulation that provided the data for FIG. 1 were resin properties and roller and foam dimensions. Although the invention is not so limited, for this simulation, the following properties were assumed: hollow cylinder outside diameter of 38 mm, hollow cylinder inside diameter of 35 mm, hollow cylinder pore diameter of 1.4 mm, open area of the hollow cylinder of 33%, length of the hollow cylinder pore area 100 mm, foam flow restrictor outside diameter of 35 mm, foam flow restrictor inside diameter of 12.7 mm, length of the foam flow restrictor 100 mm, and a resin viscosity of 15 Pa-s. In FIG. 1, the angled black line represents the permeability of the foam depending on the foam cell radius. The required permeability range resulting from the simulations then corresponds with a pore size of 300-500 microns. It is to be understood that changes in resin properties, the operating conditions and the roller and foam dimensions will result in a different graph, and thus, a different optimal pore size.

Figure 2:
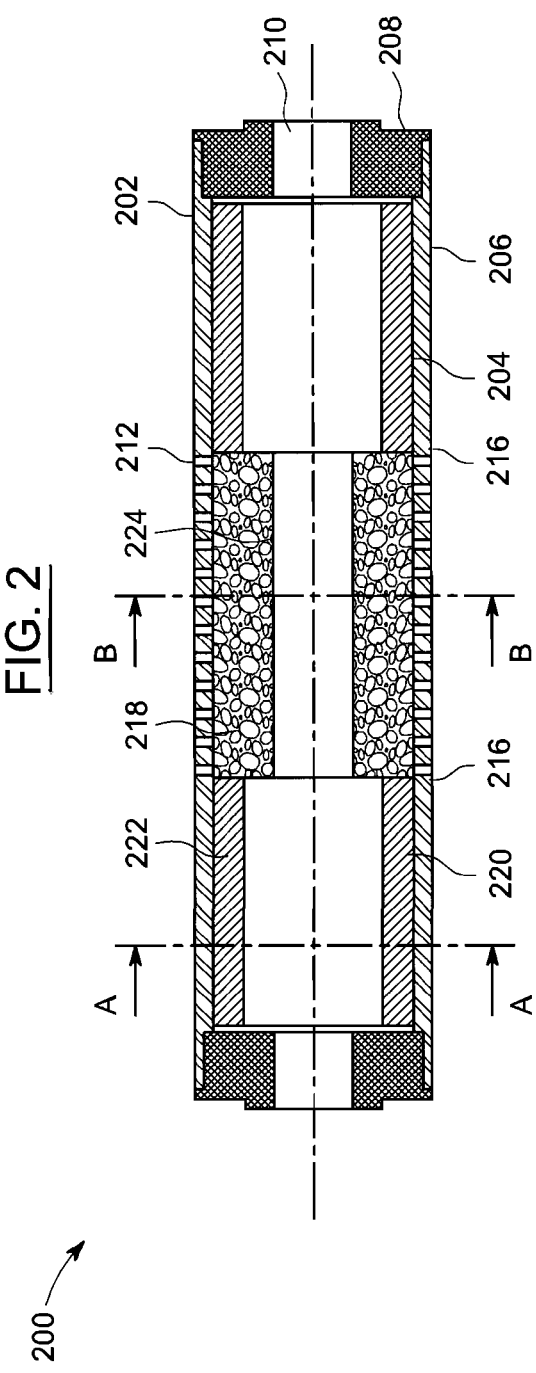
FIG. 2 is a cross-sectional view, taken in a first plane, of one embodiment of a resin infusion apparatus as provided herein.
Figure 2B:
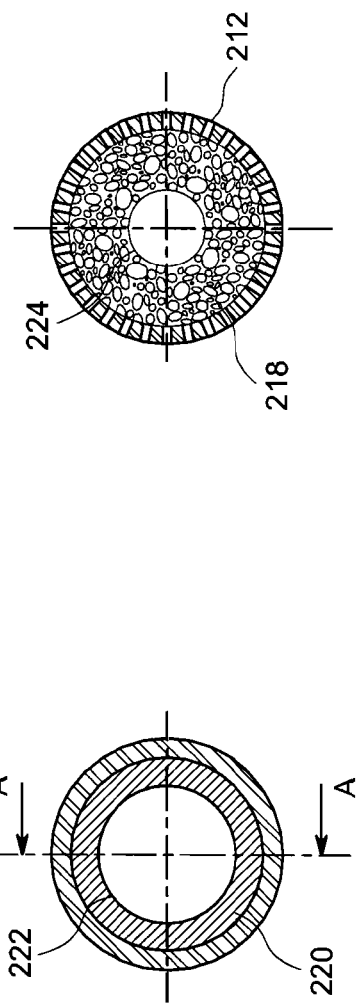
FIG. 2B is a cross-sectional view of the embodiment of the resin infusion system shown in FIG. 2, taken in a plane substantially perpendicular to the first plane and at line B-B.
Figure 2A:
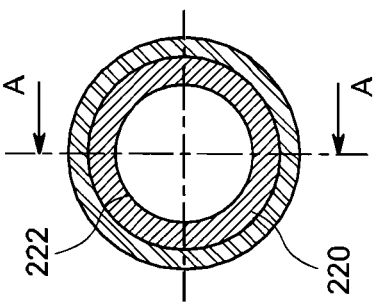
FIG. 2A is a cross-sectional view of the embodiment of the resin infusion system shown in FIG. 2, taken in a plane substantially perpendicular to the first plane and at line A-A.

Referring now to FIG. 2, there is shown one embodiment of a resin infusion apparatus as described herein. As shown in FIG. 2, resin infusion apparatus 200 comprises hollow cylinder 202 having an interior arcuate surface 204 and an exterior arcuate surface 206. Hollow cylinder 202 further comprises flat end surfaces 208. Each end surface 208 is provided with a resin inlet 210, although this is not necessarily the case. For example, hollow cylinder 202 may comprise only one resin inlet 210, provided on one end surface 208 thereof, or, may comprise a plurality of resin inlets 210 on a single end surface 208.

A plurality of pores 212 is provided in connection with hollow cylinder 202 and perforates the arcuate surface thereof, i.e., the plurality of pores connects interior arcuate surface 204 to exterior arcuate surface 206. As shown in FIG. 2, a plurality of pores 212 is provided in a middle region 216 of hollow cylinder 202, and the pores within the plurality are provided at a substantially uniform spacing from one another. However, neither configuration is required, and hollow cylinder 202 may be provided with a plurality of pores that extend substantially across the entirely of the length hollow cylinder 202, or any lesser length, or that are spaced in an irregular fashion or pattern wherein the pores are not equidistant from one another.

One or more flow restrictors, in the form of metal foam rings or discs 218, are provided within the interior hollow cylinder 202. As shown, flow restrictors 218 abut the interior arcuate surface 204 of hollow cylinder 202 and are used in a number/length that extends over substantially the entirety of the length of hollow cylinder 202 comprising pores 212, i.e., rings/discs 218 are provided in a portion of the interior of hollow cylinder 202 that substantially corresponds with perforated arcuate surfaces 204 and 206. However, this need not be the case, and metal foam rings 218 could be provided in a length that extends beyond the length of hollow cylinder 202 comprising pores 212.

Flow restrictors 218 are held in place within cylinder 202 by blocking rings 220. Blocking rings 220 may be of any configuration, so long as they are suitable to assist in holding flow restrictors 218 in place during the operation of apparatus 200. Or, this may be accomplished by other means. Blocking rings 220 desirably have an outer diameter so that they fit tightly within cylinder 202, i.e., so that a substantial amount of resin cannot flow between blocking rings 202 and the interior arcuate surface 204 of hollow cylinder 202. Desirably, the outer diameter of blocking rings 220 will be substantially equivalent to the inner diameter of hollow cylinder 202, differing sufficiently so that blocking rings 220 fit tightly within cylinder 202.

In the embodiment shown in FIG. 2, the inner diameter 222 of blocking rings 220 is greater than the internal diameter of flow restrictors 218. However, this relationship is not critical and the inner diameter 222 of blocking rings 220 may be less than, equal to, or greater than the inner diameter 224 of flow restrictors 218.

Figure 3:
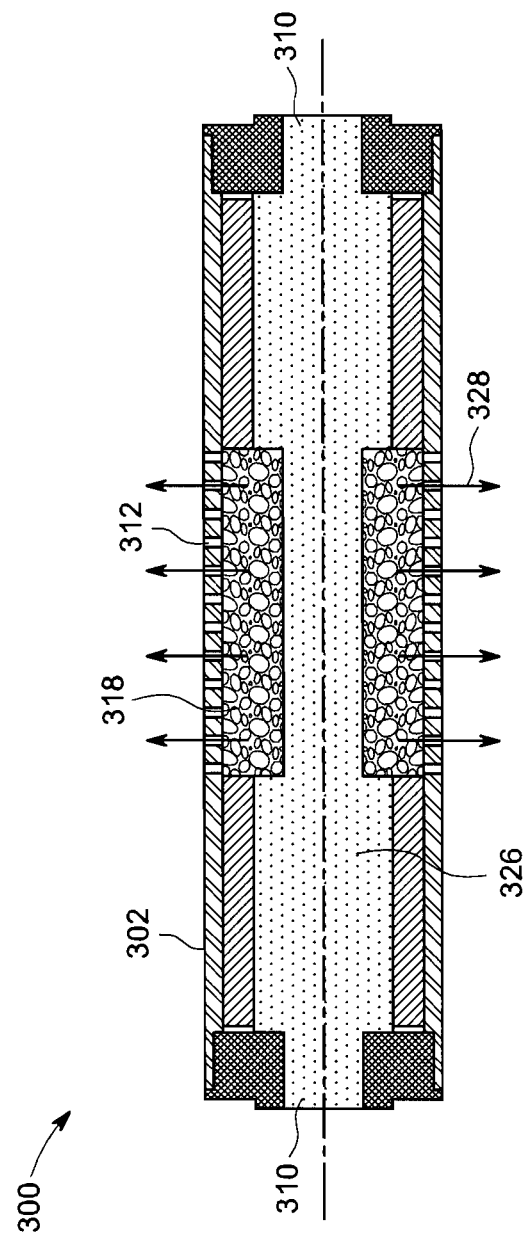
FIG. 3 is the cross-sectional view of the resin infusion apparatus shown in FIG. 2, showing the flow of resin through the cylinder.

FIG. 3 shows the resin infusion apparatus of FIG. 2 in operation. As shown, resin is pushed into hollow cylinder 302 through resin inlets 310. Resin preferentially fills cavity 326 within hollow cylinder 302. Due to the increased resistance provided by flow restrictors 318, resin will not flow through flow restrictors 318 until cavity 326 is full. Once cavity 326 is full, resin will be pushed out of pores 312 radially relatively uniformly as shown schematically by arrows 328.

The resin infusion apparatus described can be provided as a portion of a resin infusion system, and used to infuse any desired resin into any desired reinforcing material. Such a system will desirably comprise a source of the desired resin, and a pump capable of applying the desired pressure to the resin to force it through the cylinder and out the pores thereof, relatively uniformly, to infuse the desired reinforcing material.

The resin to be infused may be any typically utilized to form prepregs, i.e., the resin may be any thermoset resin useful in prepreg applications. Examples of suitable thermoset resins that may be utilized include, but are not limited to epoxies, polyesters, vinylesters, phenolic resins, polyurethanes, polyamides, or combinations of two or more of these.

Any suitable reinforcing material may be infused using the apparatus, systems and methods described. For example, relatively continuous fibers, or tows, may be arranged to form a unidirectional array of fibers, a cross-plied array of fibers, or bundled in tows that are arranged to form a unidirectional array of tows, or that are woven or cross-plied to form a two-dimensional array, or that are woven or braided to form a three-dimensional fabric. For three-dimensional fabrics, sets of unidirectional tows may, for example, be interwoven transverse to each other.

Useful fibers to be included in such reinforcing materials, such as tapes or fabrics, include without limitation, glass fibers, carbon and graphite fibers, basalt fibers, polymeric fibers, including aramide fibers, boron filaments, ceramic fibers, metal fibers, asbestos fibers, beryllium fibers, silica fibers, silicon carbide fibers, and the like. The fibers may be non-conductive or conductive, depending upon the desired application of the prepreg.

Those of ordinary skill in the art will be capable, provided with the resin infusion apparatus and system described herein, of setting up the apparatus/system to provide the desired prepreg. Generally speaking then, the resin infusion system described herein may be used to form a prepreg as follows. The desired reinforcing material may either be prepared, e.g., by arranging, aligning, weaving, etc., the desired fibers, or provided preassembled to the system. The reinforcing material is guided to a setup with one or more infusion cylinders. The reinforcing material is passed by the cylinders so that the contact of the cylinders with the reinforcing material is sufficient to allow resin to be picked up by, and infuse, the reinforcing material. The delivery speeds of the reinforcing material and the resin are matched to each other so that the desired/required resin content is achieved.

In some embodiments, the resin infusion system described herein may be combined with a layup machine so that the prepreg is formed and fed directly thereto, in a substantially continuous process. That is, once the prepreg is formed by the resin infusion system as described above, the prepreg would be provided to a layup apparatus that would then position and layup the prepreg according to the pre-programmed positions and orientations. At the start of each layup sequence, the prepreg would be fed to the layup point (compactor) and be pressed onto the layup tool or the underlaying plies. At the end of each layup sequence the prepreg would be cut. In order to increase the reliability of the process, the prepreg can either be cooled to reduce the tackiness at certain positions, or heated to increase the tackiness at other positions.

Any desired prepreg or laminate, suitable for use in a wide variety of applications, may be prepared using the resin infusion system and/or layup system provided. Examples of particular applications include windturbine components, such as, turbine blades or subcomponents of such, e.g. spars, spar caps, airfoil skins, or the cylindrical root section or tower sections of wind turbines. Laminates prepared from prepregs prepared using the apparatus and/or systems described may also be used in aviation applications, such as wing skins, fuselage skins, spars, or flat laminates such as ribs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A resin infusion apparatus for forming a prepreg from a resin and a reinforcing material comprising: at least one hollow cylinder having a plurality of pores perforating an exterior surface of the hollow cylinder; and one or more hollow porous flow restrictors surrounding an orifice, wherein the one or more flow restrictors comprise metal foam discs having an outer diameter substantially equivalent to an inner diameter of the hollow cylinder and an inner circumference of the metal foam discs that is about 40% of an outer circumference of the metal foam discs.

2. The resin infusion apparatus of claim 1, wherein the flow restrictors are provided in an amount and/or portion of an interior of the hollow cylinder to provide a substantially uniform flow of a fluid resin from the pores of the hollow cylinder when the fluid resin is supplied to the interior of the hollow cylinder under pressure.

3. The resin infusion apparatus of claim 2, wherein the portion of the interior of the hollow cylinder provided with one or more flow restrictors substantially correspond with a perforated arcuate surface of the hollow cylinder.

4. The resin infusion apparatus of claim 1, wherein an average pore radius of the plurality of pores is less than about 800 microns.

5. The resin infusion apparatus of claim 4, wherein the average pore radius of the plurality of pores is less than about 600 microns.

6. The resin infusion apparatus of claim 5, wherein the average pore radius of the plurality of pores is from about 300 microns to about 500 microns.

7. The resin infusion apparatus of claim 1, wherein the plurality of pores extends over substantially an entire width of the hollow cylinder.

8. The resin infusion apparatus of claim 7, wherein the plurality of pores extends over substantially an entirety of a circumference of the hollow cylinder.

9. The apparatus of claim 1, wherein one or more of the hollow porous flow restrictors has an inner diameter less than an inner diameter of the orifice.

10. A resin infusion system for forming a prepreg from a resin and a
reinforcing material comprising:
the resin infusion apparatus of claim 1; and
a pump for supplying the resin to the interior of the hollow cylinder.

11. The resin infusion system of claim 10, wherein the hollow cylinder comprising at least two hollow cylinders.

12. The resin infusion system of claim 11, wherein the reinforcing material may be passed between and while contacting the at least two cylinders arranged within the system.

13. A layup system for providing a laminate of a plurality of prepregs comprising:
the resin infusion system of claim 10; and
a layup apparatus.

* * * * *